United States Patent Office 3,428,459
Patented Feb. 18, 1969

3,428,459
FISH BAIT COMPOSITION
Cyril Hinds, Lafayette, La., assignor to Oil Center Research, Inc., a corporation of Louisiana
No Drawing. Filed Jan. 4, 1967, Ser. No. 607,149
U.S. Cl. 99—3         8 Claims
Int. Cl. A01k *85/02*

ABSTRACT OF THE DISCLOSURE

A dry pulverulent hydratable fish bait consisting of locust-bean or guar gum, cornmeal, wheat flour, and dehydrated ubiquitous insects.

---

This invention relates to a dry pulverulent natural fish bait composition adapted to be plasticized with water drawn from the fish's natural habitat which provides a highly viscous plastic bait highly attractive to fish which tenaciously adheres to a fishhook.

Bread, cornmeal, doughball baits and the like have been proposed heretofore as natural baits. With regard to the doughball baits they are usually made from a mixture of flour, cornmeal and some kind of sweetening. The ingredients are generally mixed into a dough and molded into balls, then cooked in boiling water to render them generally solid through gelatinization so as to facilitate their utilization on a fishhook. However, such baits are generally somewhat less than satisfactory due to the fact that they are not only bothersome to prepare but are generally susceptible to biological degradation and thus not suitable for storage such as in a tackle box inasmuch as their moisture content is generally sufficient to support and promote bacterial and fungal growth so as to render such baits unsuitable for use in a relatively short time.

It is therefore an object of the present invention to provide a dry pulverulent bait adapted to be plasticized with water drawn from the natural habitat of the fish, which pulverulent bait may be plasticized without the necessity of bothersome cooking procedures and wherein the hydrated bait forms a relatively solid viscous mass dapted to tenaciously adhere to a fishing hook.

Another object of the present invention is to provide a dry pulverulent fish bait which may be hydrated as required to provide a fresh natural bait of a relatively solid viscous nature which adheres to a fishing hook and resists the tendency to become overly water-logged whereby the bait would tend to readily disintegrate and thus fall free of the hook.

A further object of the present invention is to provide a dry pulverulent fish bait which contains a significant proportion of a vegetable gum.

Further objects and aspects of the present invention will become apparent from the following:

From the foregoing it will become apparent that the present invention involves a dry pulverulent fish bait which comprises an improvement over bread, cornmeal, doughball, etc., baits proposed heretofore due to the incorporation of a significant proportion of a hydrophilic colloid, namely a carobseed or locust-bean or guar gum. The gum is instrumental in forming when combined with ingredients used heretofore, namely, cornmeal, flour and sufficient water to hydrate, a relatively solid matrix which tenaciously but releasably retains minute particles of ubiquitoes insects such as comprise dehydrated and pulverized gnats, flies, grasshoppers, crickets and the like which gradually but controllably string off into the water and attract the fish.

As indicated heretofore the fish bait composition of the present invention is preferably provided in a dry pulverulent form adapted to be plasticized with water drawn from the natural habitat of the fish to be attracted and accordingly it will be appreciated that in the dry form, and particularly when kept in a hermetically sealed container and substantially shielded from direct light rays, the composition of the present invention may be stored for an indefinite period. It will be appreciated of course that the dry pulverulent composition is preferably rehydrated in relatively small amounts inasmuch as once hydrated, it too, like natural bait proposed heretofore, will undergo biodegradation.

More specifically, the dry pulverulent fish bait composition of the present invention comprises particular proportions of locust-bean or guar gum, cornmeal, wheat flour, and pulverized insects adapted to be mixed with a minor proportion of plasticizing water, which swells the locust-bean or guar gum while hydrating the remaining constituents so as to produce a highly viscous relatively solid natural fish bait.

The following example is included to more specifically illustrate the practice of the present invention.

The ingredients set forth in the following examples are dry blended in equal parts by weight so as to form dry pulverulent fish baits adapted to be plasticized with water drawn from the natural habitat of the fish to be lured.

Example I

|  | Parts by weight |
|---|---|
| Locust-bean gum | 1 |
| Wheat flour | 1 |
| Cornmeal | 1 |
| Pulverized dehydrated insects | 1 |

Example II

|  | Parts by weight |
|---|---|
| Guar gum | 1 |
| Wheat flour | 1 |
| Cornmeal | 1 |
| Pulverized dehydrated insects | 1 |

The dry pulverulent compoistions as set forth above are preferably hydrated for use with approximately 9 parts by weight of water to 1 part of the composition.

The foregoing is considered as illustrative only of the principles of the invention. Further, since numerous modifications and changes will readily occur to those skilled in the art, it is not desired to limit the invention to the exact composition described, and accordingly all suitable modifications and equivalents may be resorted to, falling within the scope of the invention as claimed.

What is claimed as new is as follows:

1. A dry pulverulent fish bait adapted to be plasticized with water which consists essentially of approximately equal proportions by weight of a vegetable gum seletced from the group consisting of locust-bean gum and guar gum, wheat flour, cornmeal and pulverized dehydrated insects.

2. The composition of claim 1 wherein the gum is locust-bean gum.

3. The composition of claim 1 wherein the gum is guar gum.

4. The composition of claim 1 wherein said composition is hydrated with approximately 9 parts by weight of water for each part of pulverulent composition.

5. A fish bait composition consisting essentially of 1 part by weight of equal proportions by weight of a vegetable gum selected from the group consisting of locust-bean gum and guar gum, wheat flour, cornmeal and pulverized dehydrated insects and 9 parts by weight of water.

6. The composition of claim 5 wherein the gum is locust-bean gum.

7. The composition of claim 5 wherein the gum is guar gum.

8. The composition of claim 5 wherein the water comprises water drawn from the natural habitat of the fish to be lured.

References Cited

UNITED STATES PATENTS 96,288  10/1869  Thorp _____ 99—3
2,904,436  9/1959  Auerbach _____ 99—3
3,322,544  5/1967  Yakstis _____ 99—3

RAYMOND N. JONES, *Primary Examiner.*

JAMES R. HOFFMAN, *Assistant Examiner.*